(12) United States Patent
Quintas et al.

(10) Patent No.: US 10,587,485 B2
(45) Date of Patent: *Mar. 10, 2020

(54) FEDERATED MOBILE DEVICE MANAGEMENT

(71) Applicant: AirWatch LLC, Atlanta, GA (US)

(72) Inventors: Daniel Quintas, Atlanta, GA (US); Anthony Kueh, Palo Alto, CA (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,126

(22) Filed: May 15, 2019

(65) Prior Publication Data

US 2019/0268246 A1 Aug. 29, 2019

Related U.S. Application Data

(63) Continuation of application No. 15/296,295, filed on Oct. 18, 2016, now Pat. No. 10,326,671.

(51) Int. Cl.
*H04L 12/26* (2006.01)
*H04L 12/24* (2006.01)
*H04L 29/06* (2006.01)

(52) U.S. Cl.
CPC ............ *H04L 43/04* (2013.01); *H04L 41/046* (2013.01); *H04L 41/28* (2013.01); *H04L 63/0823* (2013.01); *H04L 63/20* (2013.01)

(58) Field of Classification Search
CPC ............ H04L 63/0823; H04L 63/0884; H04L 63/0807; H04L 63/083; H04L 63/08;

(Continued)

(56) References Cited

U.S. PATENT DOCUMENTS 7,346,923 B2 * 3/2008 Atkins .................... H04L 63/08
   726/12
7,562,382 B2 * 7/2009 Hinton ................ H04L 63/0815
   709/225

(Continued)

FOREIGN PATENT DOCUMENTS

CN 101110824 6/2010
JP 2014218724 11/2014

*Primary Examiner* — Khang Do
*Assistant Examiner* — Khalid M Almaghayreh
(74) *Attorney, Agent, or Firm* — Thomas | Horstemeyer, LLP; Arvind R. Reddy; Jason M. Perilla

(57) ABSTRACT

In one example of federated mobile device management, a first management server federates with a second management server based on an exchange of one or more identity authentication certificates between them. After the first and second management servers have federated or affiliated, they can exchange mobile device management data, including compliance policies, rules, resources, etc., with each other. Based on a request from a client device for affiliated mobile device management, the first management server can request and receive device management data from the second management device. The first management server can evaluate the device management data received from the second management device for conformity with a baseline management policy. If it conforms, the first management server can use the device management data from the second management server, at least in part, to manage the client device.

20 Claims, 4 Drawing Sheets

(58) Field of Classification Search
CPC ......... H04L 63/20; H04L 43/04; H04L 12/26; G06F 21/31; G06F 21/33
USPC .... 726/1–10, 18, 22, 27; 713/172, 156, 155; 709/202, 224, 225, 229
See application file for complete search history.

(56) References Cited

U.S. PATENT DOCUMENTS

| | | | |
|---|---|---|---|
| 7,953,979 B2 | 5/2011 | Bomeman et al. | |
| 8,688,994 B2* | 4/2014 | Alkhatib | H04L 29/12264 348/14.08 |
| 8,752,152 B2* | 6/2014 | Kol | H04L 63/0815 726/8 |
| 9,401,918 B2 | 7/2016 | Lu et al. | |
| 9,882,887 B2* | 1/2018 | Rykowski | H04L 63/0815 |
| 2005/0204041 A1* | 9/2005 | Blinn | H04L 63/0815 709/225 |
| 2006/0021017 A1* | 1/2006 | Hinton | H04L 63/0815 726/10 |
| 2007/0143829 A1* | 6/2007 | Hinton | H04L 63/0815 726/5 |
| 2008/0022379 A1* | 1/2008 | Wray | G06F 21/604 726/6 |
| 2008/0263644 A1* | 10/2008 | Grinstein | G06F 21/445 726/6 |
| 2013/0152169 A1 | 6/2013 | Stuntebeck | |
| 2014/0101718 A1* | 4/2014 | Blinn | H04L 63/0815 726/1 |
| 2014/0280955 A1 | 9/2014 | Stuntebeck et al. | |
| 2016/0065552 A1* | 3/2016 | Chen | G06F 21/45 726/6 |
| 2016/0088017 A1* | 3/2016 | Green | H04L 63/20 726/1 |
| 2016/0119351 A1 | 4/2016 | Tamura | |

* cited by examiner

FEDERATED MOBILE DEVICE MANAGEMENT

CROSS-REFERENCE TO RELATED APPLICATIONS

This application is a continuation of U.S. patent application Ser. No. 15/296,295, entitled "FEDERATED MOBILE DEVICE MANAGEMENT," filed Oct. 18, 2016, the entire disclosure of which is hereby fully incorporated herein by reference.

BACKGROUND

Device management involves the administration of various computing devices, such as smartphones, tablet computers, laptops, and other computing devices, using a set of defined organizational and control policies. Device management can be implemented using certain administration services that have management features for computing devices of various manufacturers.

Companies and other organizations can control certain operating aspects of computing devices provided to their employees and members using management services. Management services focus on containerization, data segregation, policy enforcement, application distribution and management, security for email, documents, and other on-device data, and other aspects of device management. Management services can be applied to both company-owned and employee-owned (e.g., "bring your own device" (BYOD)) devices and can be provided through on-premises, cloud-based, or on-premises and cloud-based (i.e., hybrid) implementations.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
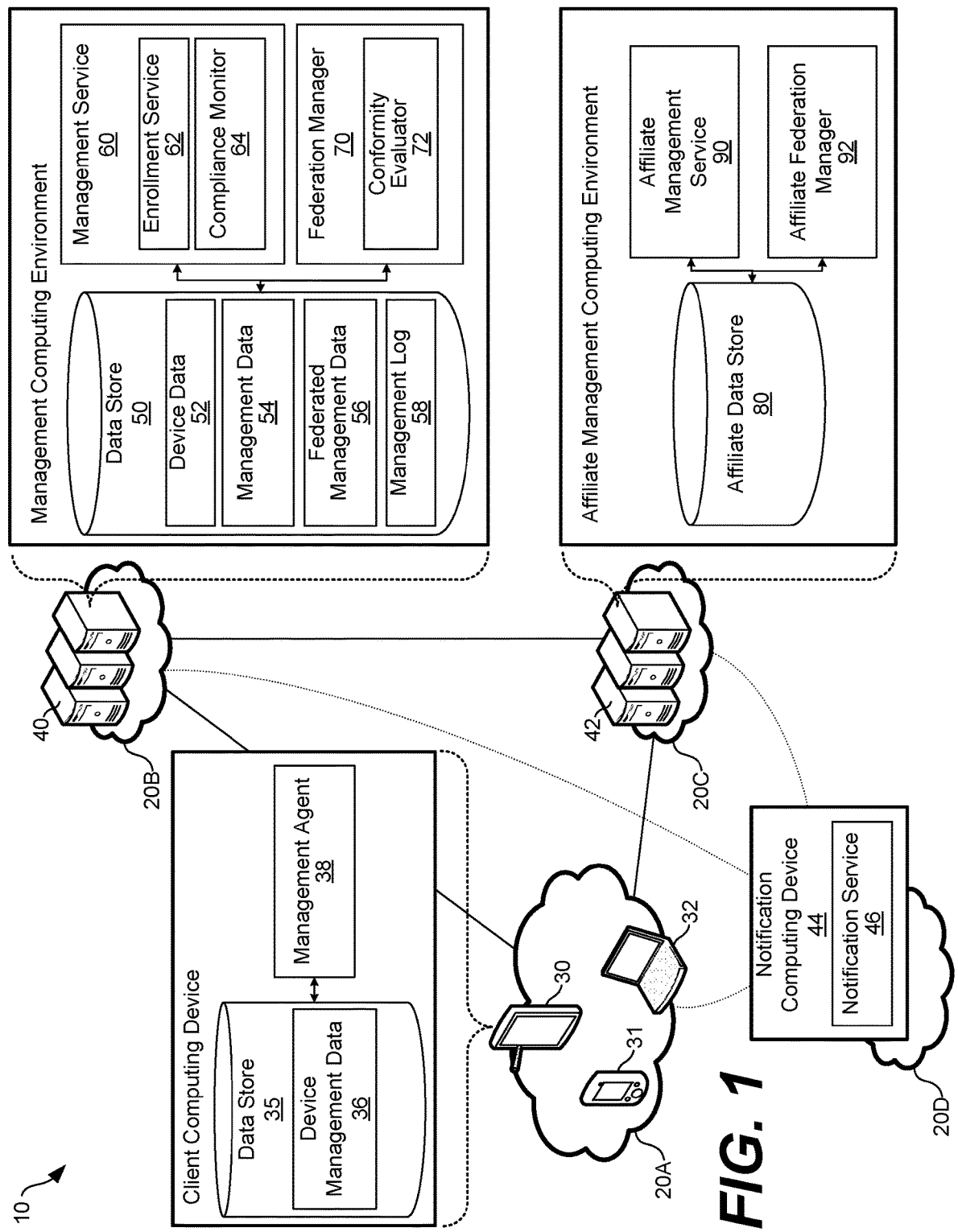
FIG. 1 illustrates an example networked environment for federated device management according to various examples described herein.

As described above, companies and other organizations can control certain operating aspects of computing devices issued to employees and other personnel using management services. Management services focus on containerization, data segregation, policy enforcement, application distribution and management, security for email, documents, and other on-device data, and other aspects of device management.

In many cases, the employees or personnel of one company or organization might perform tasks for or collaborate with another company or organization as part of a consulting assignment, cooperative work agreement, partnership, or other arrangement. In those cases (among others), it would be helpful to have a way to federate (i.e., affiliate) the device management services of different companies to manage the client devices issued to employees and other personnel of the different companies.

In the context outlined above, aspects of federated device management are described. In one example, a first management service federates with a second management service based on an exchange of one or more identity authentication certificates between them. After the first and second management services have established a federated (i.e., affiliated) relationship of trust, they can exchange device management data, including compliance policies, rules, resources, etc., with each other. Based on a request from a client device for federated device management, the first management service can request and receive affiliate management data from the second management service. The first management service can then evaluate the affiliate management data for conformity with a baseline management policy. If the affiliate management data received from the second management service conforms to the baseline management policy, the first management service can use the affiliate management data, at least in part, to manage the client device in an affiliate arrangement with the second management service.

The federated device management concepts described herein can be applied as a technical solution to the technical problems inherent in managing various types of client devices across different device management platforms. Device manufacturers and operating system developers often prohibit the administration of client devices by more than one management service at one time. Thus, once a client device is enrolled with a first management service, it is usually not possible to enforce the management policies, compliance rules, and configuration data of a second management service on the client device. Consequently, it can be necessary to un-enroll the client device from the first device management service and then enroll the client device with a second device management service, a process which is cumbersome and time consuming. Further, without first establishing a common element of trust or authenticity between first and second device management services (e.g., those of two different organizations), the security of enterprise data can be compromised by sharing enterprise-related device management data between them.

In the following paragraphs, a general description of a representative system for federated device management and its components is provided, followed by a discussion of the operation of the same. FIG. 1 illustrates an example networked environment 10 for federated device management according to various examples described herein. The networked environment 10 includes a number of networks 20A, 20B, 20C, and 20D (collectively, "the network 20"), client devices 30-32, a management computing environment 40, an affiliate management computing environment 42, and a notification computing device 44. The client devices 30-32, management computing environment 40, affiliate management computing environment 42, and notification computing device 44 comprise computing devices including one or more processors and one or more memories storing executable instructions which, when executed by the one or more processors, cause the computing devices to perform one or more computing functionalities described herein.

The network 20 can include the Internet, intranets, extranets, wide area networks (WANs), local area networks (LANs), wired networks, wireless networks, cable networks, satellite networks, other suitable networks, or various combinations thereof. The client device 30, management computing environment 40, affiliate management computing environment 42, and notification computing device 44 can communicate with each other and among other network components using application programming interfaces (APIs) and any suitable data transfer protocols, and systems interconnect frameworks, such as hypertext transfer protocol (HTTP), simple object access protocol (SOAP), security assertion markup language (SAML), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof. Although not shown in FIG. 1, the network 20 can include connections to other network hosts, such as website servers, file servers, cloud computing resources, and other network computing architectures.

The client devices 30-32 are representative of various types of computing devices, including but not limited to desktop computers, laptop computers, tablet computing devices, cellular telephones, personal digital assistants, wearable computing devices, handheld gaming devices, music or media players, etc. Thus, the client devices 30-32 can include one or more processors, processing circuits, memories, physical layer communications and other subsystem devices, etc. The client devices 30-32 can also be embodied, in part, as certain functional or logical (e.g., computer-readable instruction) elements or modules. Those elements can be executed to direct the client devices 30-32 to perform aspects of federated device management as described herein. As illustrated in FIG. 1, client device 30 includes a data store 35 and a management agent 38. The data store 35 includes a memory area for device management data 36. The components and operations of the client device 30 are described in further detail below.

The client devices 30-32 can include various hardware and/or software subsystems, such as but not limited to input subsystems, output subsystems, display subsystems, data communications subsystems, positioning or orientation subsystems, image capture subsystems, etc. The input subsystems can include keyboards, keypads, touch pads, touch screens, microphones, cameras, buttons, switches, sensors, global positioning systems (GPS), or other subsystems. The output and display subsystems can include speakers, ringers, buzzers, haptic feedback systems, display screens, indicator lights, etc. The data communications subsystems can include cellular, IEEE 802.11-based Wi-Fi, Bluetooth®, or any other suitable data communications system or variant thereof. The positioning or orientation subsystems can include motion sensors, orientation sensors, accelerometers, gyroscopes, etc. The image capture subsystem can include image sensors, flashes, optical assemblies, etc. The client devices 30-32 can also execute various applications. Among other types of applications, the applications can include Internet browsers, e-mail applications, spreadsheet or word processing applications, image processing applications, video and audio players and editor applications, etc.

The management computing environment 40 can be embodied as a computing device, server, system, or environment. In certain embodiments, the management computing environment 40 can include one or more computing devices arranged, for example, in one or more server or computer banks. The computing device or devices can be located at a single installation site or distributed among different geographical locations. In another case, the management computing environment 40 can include a plurality of computing devices that together embody a hosted computing resource, a grid computing resource, and/or other distributed (e.g., cloud-based) computing arrangement. In some cases, the management computing environment 40 can be embodied as an elastic computing resource where an allotted capacity of processing, network, storage, or other computing-related resources varies over time. As further described below, the management computing environment 40 can also be embodied, in part, as certain functional or logical (e.g., computer-readable instruction) elements or modules. Those elements can be executed to direct the management computing environment 40 to perform aspects of federated device management as described herein. The affiliate management computing environment 42 can also be embodied as a computing device, system, or environment similar to the management computing environment 40, the components and operation of which are described below.

The management computing environment 40 can be relied upon as (e.g., execute or function as) a management service for the client device 30, among other devices. In that context, the management computing environment 40 includes a data store 50, a management service 60, and a federation manager 70. The data store 50 includes various memory areas including those for device data 52, management data 54, federated management data 56, and a management log 58. The management service 60 includes an enrollment service 62 and a compliance monitor 64, and the federation manager 70 includes a conformity evaluator 72. The operation and functions of the components of the management computing environment 40 are described in further detail below.

Similar to the management computing environment 40, the affiliate management computing environment 42 can provide a management service for client devices 30-32. The affiliate management computing environment 42 includes an affiliate data store 80, an affiliate management service 90, and an affiliate federation manager 92. The operation and function of the affiliate management computing environment 42 is described in further detail below. Being separate platforms, the management computing environment 40 and the affiliate management computing environment 42 can provide management services, respectively, for two different enterprises, organizations, jurisdictions, legal entities, or parties.

The notification computing device 44 can be embodied as a computing device, system, or environment that provides a notification service 46. In one example, the notification service 46 is configured to transmit a notification to the client device 30, among other client devices, to prompt the client device 30 to check in with a management service 60. In that context, the notification service 46 can operate as a type of cloud messaging or push notification service capable of sending notifications to various client devices (e.g., client devices 30-32).

The client device 30 can establish an outbound connection with the notification service 46 when it is powered on and reestablish the outbound connection after a period of network access unavailability. The connection can be persistent and encrypted, but it is not necessary that a persistent or encrypted connection be maintained in all cases or at all times. When the connection between the client device 30 and the notification service 46 cannot be established or is lost, the client device 30 can reestablish the connection on another (or a variable) frequency, channel, and/or port by sending a message or request (e.g., hello message, indicator, or request) to the notification service 46. Upon reestablishment of the connection, the notification service 46 can send any notifications or messages that did not reach the client device 30 during the period of lost connection.

Thus, the notification service 46 can propagate notifications or messages to the client device 30 (or the operating system of the client device 30) for further processing. As discussed below, notifications from the notification service 46 can be used in the context of management services to notify the client device 30 that certain commands or other data is queued up in a command queue at the management service 60. In turn, when one of the client devices 30-32 receives a notification, it is configured to check in with (e.g., communicate with) the management service 60 to cause the management service 60 to provide access to the contents of the command queue or other instructions or data.

The client device 30 can be enrolled for device management by the management service 60 (or, alternatively, the affiliate management service 90). To that end, the enrollment service 62 can enroll the client device 30 for management services. To begin enrollment, the enrollment service 62 can identify and authenticate the client device 30 and store data related to the client device 30 in the device data 52 for later reference. Thereafter, the management service 60 and/or management agent 38 can be registered as a device administrator of the client device 30, permitting the management service 60 and/or management agent 38 to manage the operating aspects and use of the client device 30. In that role, the management agent 38 can have privileges to control the operation of the client device 30. In one case, the management agent 38 can be registered as the device administrator of the client device 30 through the installation of a management profile in a profile bank of an operating system of the client device 30 upon a user's acceptance of various terms and conditions related to the management of the client device 30. The installation of the management profile in the profile bank of the operating system of the client device 30 permits the management agent 38 to operate as the administrator of the client device 30. As the administrator, the management agent 38 can configure various operating settings and parameters of the client device 30.

The management service 60 can remotely configure the client device 30 as part of enrollment by interacting with the management agent 38. In that way, the management service 60 can cause the management agent 38 to instruct the operating system of the client device 30 to cause certain operations to occur. The management service 60 can also transmit commands directly to the operating system of the client device 30 to cause certain operations to occur on the client device 30. The management service 60 can transfer various software components to the client device 30, and those software components can be installed and/or configured on the client device 30 at the direction of the management agent 38 or the management service 60. Such software components can include, for example, applications, resources, libraries, drivers, device configurations, or other related components.

The management service 60 can also transfer various management policies or compliance rules for enforcement on the client device 30. In that context, during or after enrollment, the management service 60 can retrieve a set of management policies and/or compliance rules from the management data 54 and transfer them to the client device 30. The management data 54 can include any of the management policies, compliance rules, or configuration data described herein. When received by the client device 30, the management data 54 can be stored as the device management data 36 for reference by the management agent 38 or the operating system of the client device 30.

The management data 54 can include various device management policies, compliance rules, and configuration data. Management policies can include specifications of access rights associated with the client device 30. For instance, the management policies can define conditions under which particular users are authorized to access particular resources on the client device 30. In that sense, the management policies can permit or deny access based on device geolocation, device network connection, device operating system status (e.g., whether a device has been jailbroken), and other factors.

The compliance rules can define one or more remedial actions to potentially take against the client device 30 when or if it is determined that the client device 30 is in a particular state. For example, a compliance rule can specify that certain enterprise resources should be inaccessible to the client device 30 when it is determined that there are one or more unauthorized applications installed on or being executed by the client device 30, or that the operating system of the client device 30 has been modified (e.g., jailbroken or rooted).

The configuration data can include specifications for the functionality of the client device 30. In one example, the configuration data can include credentials, such as certificates, profiles, tokens, passwords, PINs, etc. that the client device 30 should use for authentication or encryption. In another example, the configuration data can include settings that enable, disable, control or modify the functionality (e.g., microphone, camera, wireless capabilities, or other functionalities) of the client device 30. The settings can be static or dynamic, such that the client device 30 must apply them all the time or under certain circumstances, respectively. For instance, the settings can be dynamic such that they are applied during certain times of the day or when the client device 30 is physically located in a particular location.

When management data 54 is received by the client device 30 from the management computing environment 40, it can be stored as the device management data 36 as described above. The management service 60 can then instruct the management agent 38 and the operating system of the client device 30 to enforce the management policies, compliance rules, and configuration data stored in the device management data 36. At the same time, the compliance monitor 64 is configured to verify whether the client device 30 is in compliance with the device management data 36. Thus, the compliance monitor 64 can monitor various operating aspects of the client device 30 to ensure that the client device 30 (and the data on the client device 30) is protected from loss, unauthorized access, or other harmful events.

The management service 60 can also provision the transfer of certain data, including management policies, compliance rules, configuration data, applications, data files, and other data, to the client device 30 through use of a command queue. The management service 60 can store commands in the command queue for the client device 30 and configure the management agent 38 to retrieve the contents of the command queue at certain times. In one example, the management agent 38 can be configured to retrieve the contents of the command queue on a configured interval, such as every four hours, or upon occurrence of a certain event, such as a detection of an unauthorized application executed by the client device 30. Alternatively, the management service 60 can cause the notification service 46 to notify the client device 30 that commands are queued up and waiting in a command queue. In any case, the management agent 38 can retrieve the contents of the command queue by checking in with the management service 60 to obtain the contents of the command queue. The contents of the command queue can include commands for execution on the client device 30 (e.g., install application, retrieve files, delete files, wipe device, etc.). To complete the commands, the client device 30 can access applications or other data using a specified uniform resource locator (URL) specified as part of the command queue, for example.

Similar to the management service 60, the affiliate management computing environment 42 can provide a management service for various client devices (e.g., client devices 30-32). To that end, the affiliate management service 90 operates in a manner similar to the management service 60 of the management computing environment 40, and the affiliate data store 80 stores data similar to that stored in the data store 50. Thus, the management computing environment 40 and the affiliate management computing environment 42 can enroll different client devices for management services and enforce different management policies, compliance rules, and configuration data on the enrolled client devices. Typically, if the client device 30 were enrolled with the management computing environment 40, it would not be possible to enforce the management policies, compliance rules, and configuration data of the affiliate management service 90 on the client device 30. However, such integration of the management services can be achieved through a federation of the management service 60 with the affiliate management service 90 as described herein.

According to the concepts of federated device management described herein, the management service 60 and the affiliate management service 90 can be federated with each other in certain cases. The federation can begin with an authentication process to establish identify and trust. For example, the management service 60 can receive and verify an identity certificate, digital signature, or some other authenticatable data structure from the affiliate management service 90 using a REST API or other suitable application interface over the network 20. In some cases, the management service 60 and the affiliate management service 90 can exchange identity certificates or other authenticatable data. The identity certificate or other authenticatable data can be verified by the management service 60 to establish the identity of the affiliate management service 90 as a trusted affiliate. Depending upon the type of authenticatable data structure being exchanged, for example, it can be verified by a certification authority or other third party certification service, if necessary. Also, in some cases, the authentication process can lead to the exchange of keys as part of authentication, for secure communications, or for other purposes.

After the management service 60 and the affiliate management service 90 have established a relationship of trust between each other, they can exchange management policies, compliance rules, and configuration data with each other. The management service 60 can then promulgate and enforce the management policies, compliance rules, and configuration data of the affiliate management service 90 on the client devices it has enrolled for management services, and vice versa. Thus, even if the client device 30 is currently enrolled with management services through the management service 60, a user of the client device 30 can request federated device management associated with the affiliate management service 90. In turn, the affiliate management service 90 can transmit, and the management service 60 can receive, management policies, compliance rules, and configuration data for management of the client device 30. In that way, the management policies, compliance rules, and configuration data of the affiliate management service 90 can be promulgated to and enforced on the client device 30 although the client device 30 is enrolled for device management services by the management service 60 of the management computing environment 40.

Figure 2A:
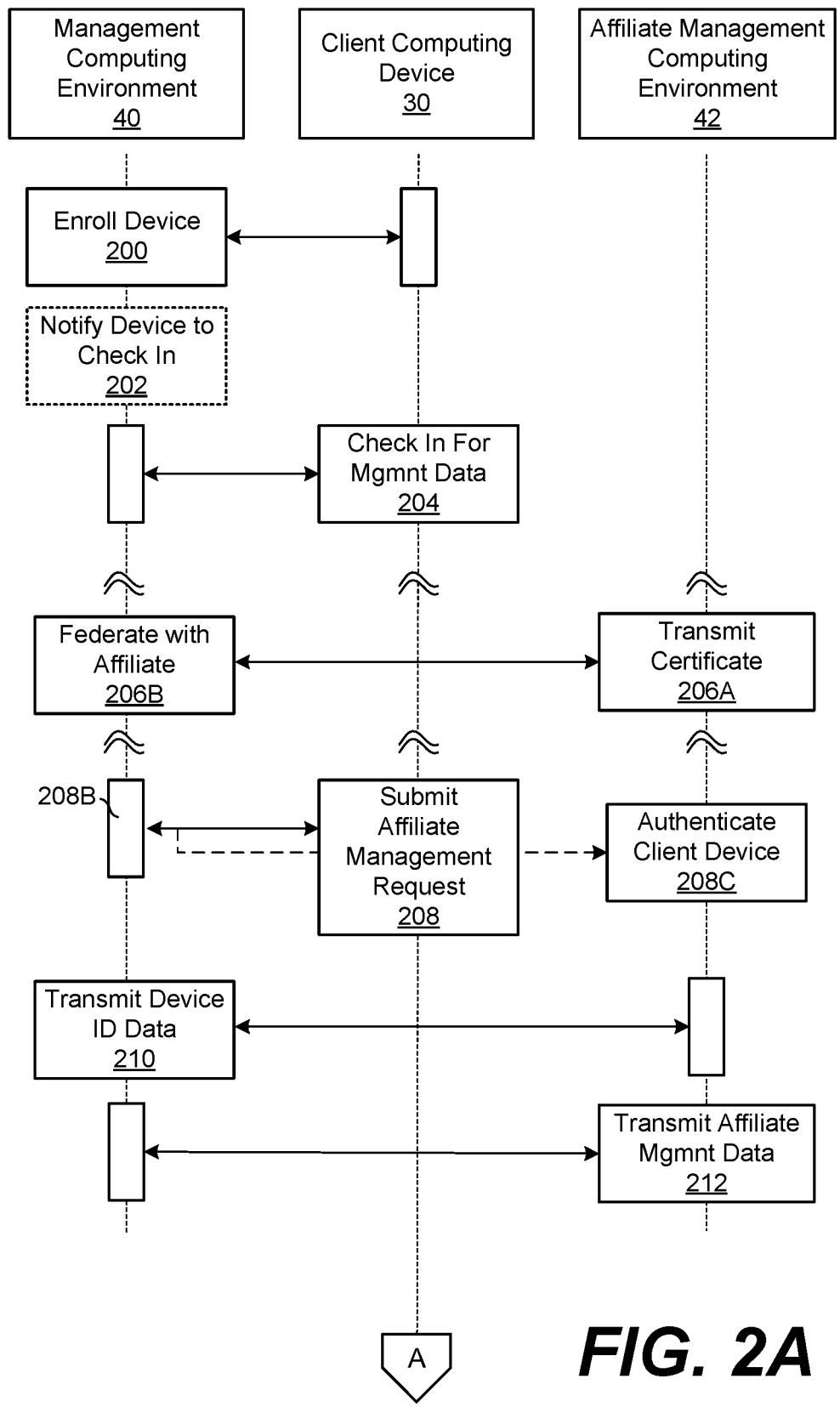
FIGS. 2A-2C illustrate a process for federated device management performed in the networked environment shown in FIG. 1 according to various examples described herein.
Figure 2B:
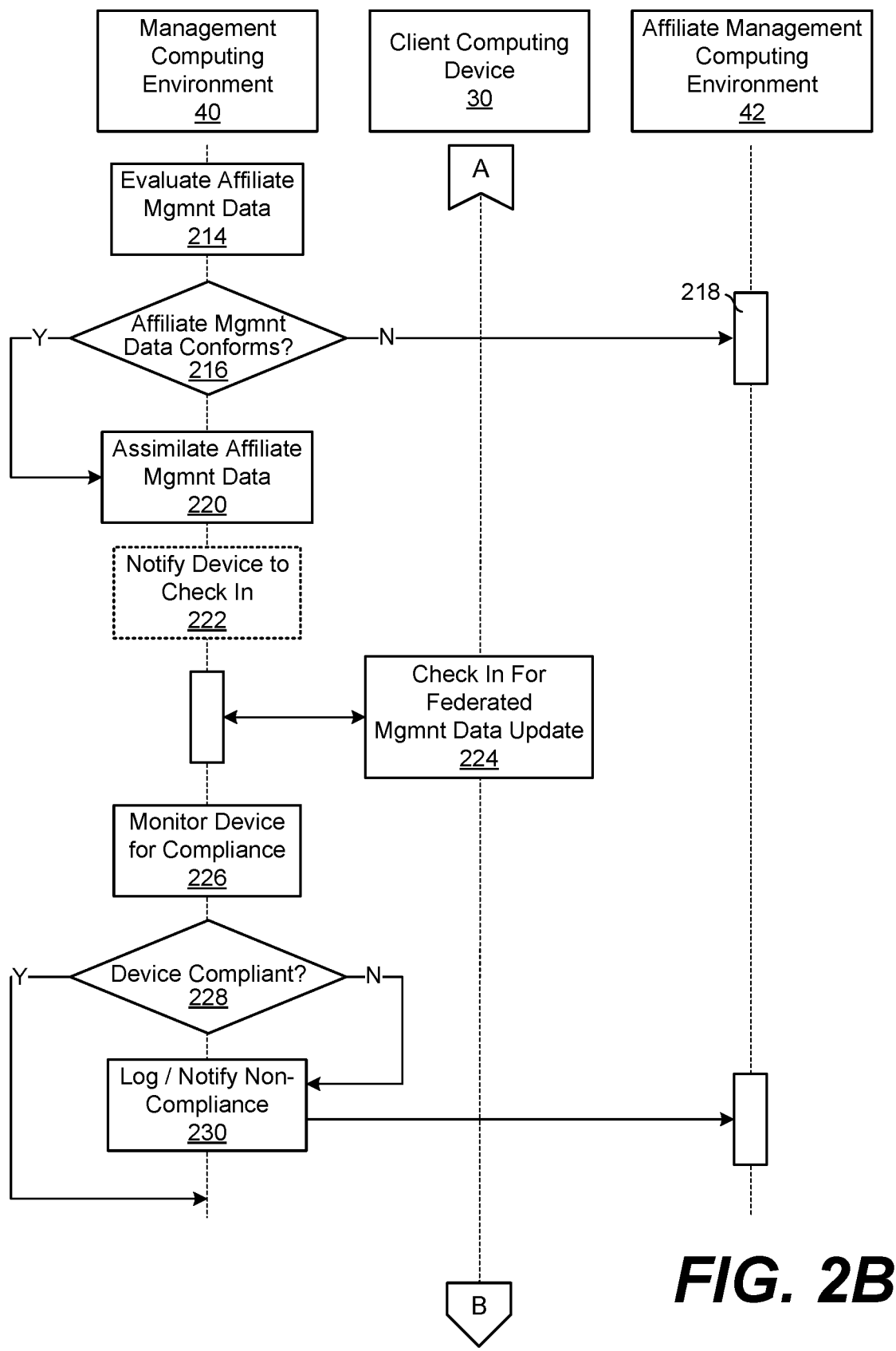
Figure 2C:
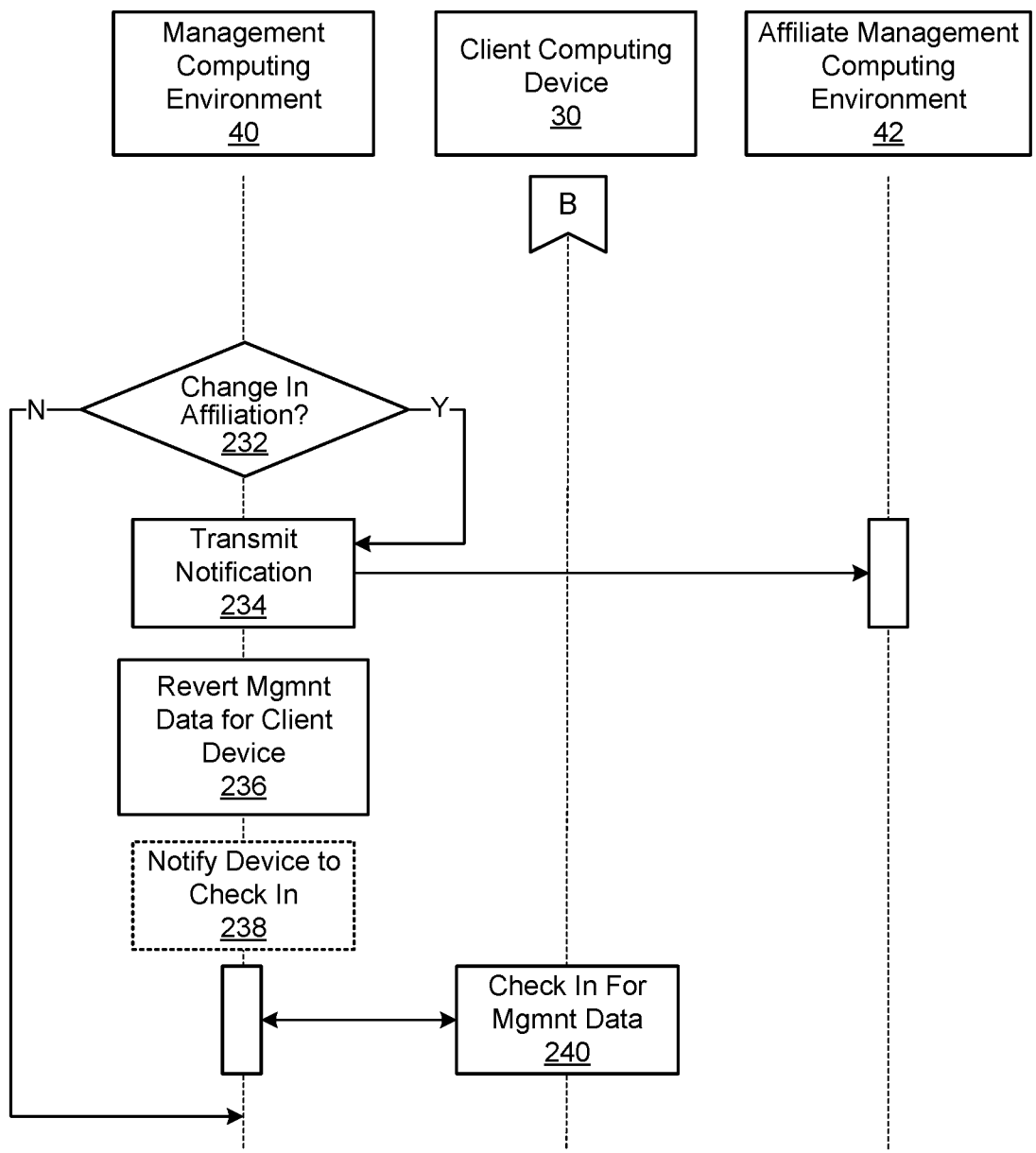

Additional aspects related to the manner in which affiliated mobile device management is achieved between the management computing environment 40 and the affiliate management computing environment 42 is described in greater detail below with reference to FIGS. 2A-2C. FIGS. 2A-2C illustrate a process for federated device management performed in the networked environment 10 shown in FIG. 1. The process illustrated in FIGS. 2A-2C is described in connection with the client device 30, the management computing environment 40, and the affiliate management computing environment 42, although other computing devices could perform the process.

Consistent with the example shown in FIG. 1, the client device 30 includes a management agent 38 which can perform, at least in part, one or more of the processes described in FIGS. 2A-2C as being performed by the client device 30. In some cases, however, one or more of the processes described in FIGS. 2A-2C can be performed, in part, by an operating system of the client device 30. In either case, the processes described as being performed by the client device 30 can be directed in part by the management service 60 of the management computing environment 40 and/or the affiliate management service 90 of the affiliate management computing environment 42.

Similarly, any of the processes described in FIGS. 2A-2C as being performed by the management computing environment 40 can be performed by the management service 60, the federation manager 70, a combination thereof, or other related services or applications executing on the management computing environment 40. The processes described in FIGS. 2A-2C as being performed by the affiliate management computing environment 42 can be performed by the affiliate management service 90, the affiliate federation manager 92, a combination thereof, or other related services or applications executing on the affiliate management computing environment 42.

Although the flowcharts shown in FIGS. 2A-2C show a certain order of execution, the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

At step 200, the process can include enrolling the client device 30 with the management computing environment 40 for device management. As part of that process, the client device can be caused to be managed by the management service 60 of the management computing environment 40. To that end, the client device 30 can transmit one or more device identifiers, user identifiers, or other device- or user-related data to the management computing environment 40, and the enrollment service 62 executing on the management computing environment 40 can then identify and authenticate the client device 30. The management service 60 and/or management agent 38 can then be registered as a device administrator of the client device 30. In one case, the management agent 38 can be registered as the device administrator of the client device 30 through the installation of a management profile in a profile bank of an operating system of the client device 30 upon a user's acceptance of various terms and conditions related to the management of the client device 30. The installation of the management profile in the profile bank of the operating system of the client device 30 can cause the management agent 38 to operate as the administrator of the client device 30. As the administrator, the management agent 38 can configure various operating settings and parameters of the client device 30.

During enrollment at step 200, the management service 60 can remotely configure the client device 30 by interacting with the management agent 38 as described herein. In that context, the management service 60 can also transfer one or more management policies, compliance rules, and configuration data, as well as software applications in some cases, to the client device 30. Those management policies, compliance rules, configuration data, and applications can be installed and/or configured on the client device 30 by the management agent 38 (and/or the operating system of the client device 30) at the direction of the management service 60.

In some cases, as part of enrolling, step 202 can also include the management computing environment 40 notifying the client device 30 to check in with the management computing environment 40. For example, the management computing environment 40 can direct the notification service 46 to notify the client device 30 that one or more commands are queued up in a command queue at the management computing environment 40. The commands can direct the client device 30 to conduct a mobile device management update for enrollment.

At step 204, the process includes the client device 30 checking in with the management computing environment 40. The client device 30 can check in at step 204 in response to the notification at step 202 or based on another command or predetermined timing to check in. As part of the check in, the client device 30 and the management computing environment 40 can communicate with each other to transfer the contents of the command queue from the management computing environment 40 to the client device 30. Based on the commands in the command queue, the client device 30 can retrieve, install, and/or configure various software applications and components. The client device 30 can also receive, store, and configure various compliance policies or rules for enforcement on the client device 30 based on the commands.

The process of enrollment outlined above in steps 200, 202, and 204 is provided by way of example, and variations on the process are within the scope of the concepts described herein. For example, it is not necessary in every case that the client device 30 be notified at step 202 to check in or that the client device 30 separately checks in with the management computing environment 40 apart from the communications between them that occurs at step 200. Additionally, it should be appreciated that any number of client devices can be enrolled with the management computing environment 40 for device management.

As for federating the management computing environment 40 with the affiliate management computing environment 42, at step 206A, the process can begin with the affiliate management computing environment 42 transmitting an identity certificate, digital signature, or other authenticatable data structure to the management computing environment 40. The authenticatable data structure can be used by the management computing environment 40 to confirm the authenticity of the affiliate management computing environment 42. In other words, the authenticatable data structure can be used by the management computing environment 40 to confirm the identity of the affiliate management computing environment 42 and avoid any possibility of federating with other, unknown computing environments.

At step 206B, the process can include the management computing environment 40 receiving the identity certificate, digital signature, or other authenticatable data structure transmitted from the affiliate management computing environment 42 at step 206A. The authenticatable data structure can be verified by the management computing environment 40 to establish the identity of the affiliate management computing environment 42 as a trusted affiliate. Depending upon the type of authenticatable data structure being exchanged, for example, the data can be verified by a certification authority or other third party certification service, if necessary. Authenticatable data structures can also be communicated from the management computing environment 40 to the affiliate management computing environment 42 among steps 206A and 206B in certain cases. Additionally, encryption keys for secure communications or other purposes can be communicated among the management computing environment 40 and the affiliate management computing environment 42 among steps 206A and 206B in certain cases.

After the management computing environment 40 is federated or affiliated with the affiliate management computing environment 42, the client device 30 can request device management service associated with the affiliate management computing environment 42. At step 208A, the process can include the client device 30 transmitting and a request for management by the affiliate management computing environment 42, and the management computing environment 40 can identify the request. Here, the client device 30 sends the request to the management computing environment 40 rather than to the affiliate management computing environment 42. A user of the client device 30 might request device management service by another organization for various reasons, such as being assigned to work with another company or organization as part of a consulting assignment, cooperative work agreement, partnership, or for other reasons.

At step 208B, the process can include the management computing environment 40 redirecting the request from the client device 30 to the affiliate management computing environment 42 for authentication, if necessary. As part of that redirection, the client device 30 and the management computing environment 40 can exchange data using security assertion markup language (SAML), for example, or another data exchange format.

At step 208C, the process can include the affiliate management computing environment 42 authenticating the client device 30. To do so, the client device 30 and the affiliate management computing environment 42 can exchange authentication and authorization data using SAML, for example, or another data exchange format. The process can also include the affiliate management computing environment 42 gathering certain data to identify the client device 30, such as device identifiers, user identifiers, and other device- and/or user-related data. Upon a successful authentication of the client device 30, the affiliate management computing environment 42 can provide an authentication token to the client device 30. In turn, the client device 30 can forward the authentication token to the management computing environment 40 as evidence of a successful authentication with the affiliate management computing environment 42.

At step 210, the process can include the management computing environment 40 requesting affiliate management data from the affiliate management computing environment 42. As part of that request, the management computing environment 40 can cause device identification data for the client device 30 to be accessible to the affiliate management computing environment 42. For example, the management computing environment 40 can transmit device identification data associated with the client device 30 to the affiliate management computing environment 42. The device identification data can include device identifiers, user identifiers, and/or other device- or user-related data of the client device 30.

At step 212, the process can include the affiliate management computing environment 42 retrieving affiliate management data for the client device 30 and transmitting it to the management computing environment 40. The affiliate management data can be retrieved from the affiliate data store 80, for example, and can include management policies, compliance rules, and configuration data. As described herein, the management policies, compliance rules, and configuration data in the affiliate management data can be similar to those defined in the management data 54, although tailored for the organization, legal entity, or party associated with the affiliate management computing environment 42.

Turning to FIG. 2B, at step 214, the process can include the federation manager 70 of the management computing environment 40 identifying and evaluating the affiliate management data received at step 212. For example, the conformity evaluator 72 can evaluate the affiliate management data for conformity with a baseline management policy of the management computing environment 40. The baseline management policy might set certain minimum requirements for management policies, compliance rules, and configuration data, restrictions on the installation or removal of certain applications, or other limits on device management or operation.

At step 216, the process can include the conformity evaluator 72 determining whether the affiliate management data from the affiliate management computing environment 42 conforms with the baseline management policy of the management computing environment 40. Non-conformity might result if the affiliate management data falls below certain minimum requirements for policies or rules, conflicts with certain application restrictions or requirements, or conflicts with other requirements, limits, or standards according to the evaluation at step 214.

If non-conformity is determined at step 216, the process can include the management computing environment 40 transmitting a notification or message of non-conformity to the affiliate management computing environment 42. At step 218, the process can include the affiliate management computing environment 42 receiving the notification of non-conformity from the management computing environment 40. In some cases, notice of non-conformity can result in a negotiation between the management computing environment 40 and the affiliate management computing environment 42 for a common set of policies or rules which satisfies a baseline (or adjusted baseline) management policy of both the environments. In other cases, a non-conforming attempt at federated device management might end at step 218.

If conformity is determined at step 216, the process proceeds to step 220, in which case the process can include the federation manager 70 assimilating at least a portion of the affiliate management data received at step 212 into the federated management data 56 for promulgation to and enforcement on the client device 30. The assimilated or federated management data can be stored as the federated management data 56 in the data store 50, for example, and used as an updated set of policies and rules for federated management of the client device 30.

The federated management data 56 can include a combination of device management policies, compliance rules, and configuration data from the management computing environment 40 and other management policies, compliance rules, and configuration data from the affiliate management computing environment 42. The merger or combination of the management policies, compliance rules, and configuration data can be driven by a selection of the most restrictive polices or rules, the least restrictive policies or rules, a combination of more and/or less restrictive policies or rules and other factors. In other cases, the federated management data 56 can include only the management policies, compliance rules, and configuration data received from the affiliate management computing environment 42.

At step 222, the process can include the management computing environment 40 notifying the client device 30 to check in for a device management update based on federated device management data. For example, the management computing environment 40 can direct the notification service 46 to notify the client device 30 that one or more commands are queued up in a command queue at the management computing environment 40. The commands can direct the client device 30 to conduct a mobile device management update for federated device management.

At step 224, the process can include the client device 30 checking in with the management computing environment 40. As part of the check in, the management computing environment 40 can communicate with the client device 30 to transfer commands in an updated command queue (or other data) to the client device 30. Based on the commands in the updated command queue, the client device 30 can retrieve, install, and configure affiliated management data from the federated management data 56. The affiliated management data can be stored as part of the device management data 36 in the data store 35 on the client device 30. In turn, the management agent 38 can enforce the management policies, compliance rules, and configuration data of the affiliated management data, which includes policies and rules from the affiliate management computing environment 42.

At this point, the client device 30 can operate, at least in part, according to the management policies, compliance rules, configuration data, etc., of the affiliate management computing environment 42. This can be helpful when the employees or personnel of one company or organization might need to perform tasks for or collaborate with another company or organization as part of a consulting assignment, cooperative work agreement, partnership, or other arrangement. In those cases (among others), it is helpful to have a way to federate or affiliate the device management services of different companies. Through federated device management service resources, the client device 30 can be easily configured for network access, document access and editing rights, printer access, permissions, and other resources of another company. Additionally, those resources can be taken away at a later time based on a change in affiliation as described below.

At step 226, the process can include the compliance monitor 64 of the management computing environment 40 (and/or the management agent 38 of the client device 30) monitoring the client device 30 for any actions, operations, or conditions that fail to comply (e.g., non-compliance) with at least one policy or rule of the affiliated management data stored as part of the device management data 36. That is, the compliance monitor 64 can verify whether the client device 30 is in compliance with the management policies, compliance rules, and configuration data from the affiliate management computing environment 42. Thus, the compliance monitor 64 can ensure that the client device 30 complies with the device management requirements of the affiliate management computing environment 42 although the client device 30 is not enrolled for device management with the affiliate management computing environment 42.

If the client device 30 fails to comply, the process can include the management computing environment 40 logging the failure in the management log 58 at step 230. In some cases, at step 230 the process can also include the management computing environment 40 transmitting a notification of the failure and/or the log of the failure to the affiliate management computing environment 42. Before or after the affiliate management computing environment 42 receives the notification of the non-compliance, various remedial actions can be taken as described herein. In another example case, if the client device 30 fails to comply with a policy or rule of the management computing environment 40 but not a policy or rule of the affiliate management computing environment 42, no notification may be sent from the management computing environment 40 to the affiliate management computing environment 42 as part of the process at step 230. On the other hand, while the client device 30 complies with the policies and rules in the affiliated management data, the process can proceed to FIG. 2C.

At step 232 in FIG. 2C, the process can include the federation manager 70 of the management computing environment 40 identifying whether a change in affiliation at the client device 30 or at the affiliate management computing environment 42 has occurred. A change in affiliation can occur if the management computing environment 40 and the affiliate management computing environment 42 are no longer trusted partners with each other. As another example, a change in affiliation can occur if the user of the client device 30 is no longer working with an affiliate company associated with the affiliate management computing environment 42, strays outside a certain geolocation boundary, or rejects some requirement of federated mobile device management. If no change in affiliation is identified at step 232, the process proceeds as illustrated in FIG. 2C. If a change in affiliation is identified at step 232, the process can include the management computing environment 40 transmitting a notification of the change to the affiliate management computing environment 42 at step 234.

At step 236, the process can include the federation manager 70 reverting the device management data for the client device 30 back to a previous state. In other words, the federation manager 70 prepares the client device 30 for an update of device management policies, compliance rules, and configuration data which remove or replace any policies, rules or configuration data from the affiliate management computing environment 42. Additionally or alternatively, the federation manager 70 can delete any device management data stored in the federated management data 56 which was received from the affiliate management computing environment 42.

At step 238, the process can include the management computing environment 40 notifying the client device 30 to check in for another mobile device management update (e.g. one to remove or replace any affiliate management data from the affiliate management computing environment 42). As described above, the management computing environment 40 can use the notification service 46 to notify the client device 30 that commands are queued up and waiting to be retrieved.

At step 240, the process can include the client device 30 checking in with the management computing environment 40. As part of the check in, the management computing environment 40 can communicate with the client device 30 to transfer the contents of the command queue or other data to the client device 30. Based on the commands in the command queue, the client device 30 can retrieve, install, and configure a set of mobile device management data which, as described above, is free of any affiliate device management data from the affiliate management computing environment 42.

The flowchart in FIGS. 2A-2C shows examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The client device 30, management computing environment 40, affiliate management computing environment 42, and notification computing device 44 can each include at least one processing circuit. Such a processing circuit can include, for example, one or more processors and one or more storage devices that are coupled to a local interface. The local interface can include, for example, a data bus with an accompanying address/control bus or any other suitable bus structure.

The storage devices for a processing circuit can store data or components that are executable by the processors of the processing circuit. For example, the management service 60, federation manager 70, and similar functions or logic components described herein can be stored in one or more storage devices and be executable by one or more processors in the management computing environment 40. Also, a data store, such as the data store 50 can be stored in the one or more storage devices.

The management service 60, federation manager 70, and similar components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 60, federation manager 70, and similar components described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code for affiliated device management executable in at least one computing device, the program code, when executed by the at least one computing device, being configured to cause the at least one computing device to at least:
   identify a request for a client device to be managed by a second management service;
   authenticate the second management service for federated device management of the client device with a first management service;
   receive device management data from the second management service; and
   evaluate the device management data from the second management service for conformity with a baseline management policy of the first management service.

2. The non-transitory computer-readable medium according to claim 1, wherein the program code is further configured to cause the at least one computing device to at least:
   in an instance in which the device management data from the second management service is in conformity with the baseline management policy, assimilate at least a portion of the device management data from the second management service into federated management data for management of the client device by the first management service.

3. The non-transitory computer-readable medium according to claim 2, wherein the program code is further configured to cause the at least one computing device to at least:
   after at least the portion of the device management data from the second management service is assimilated into the federated management data, notify the client device to check in for a device management update.

4. The non-transitory computer-readable medium according to claim 3, wherein:
   the federated management data comprises a combination of the device management data from the second management service and device management data from the first management service; and
   the device management update includes the federated management data.

5. The non-transitory computer-readable medium according to claim 1, wherein the program code is further configured to cause the at least one computing device to at least:
   in an instance in which the device management data from the second management service is not in conformity with the baseline management policy, notify the second management service that the device management data is not in conformity.

6. The non-transitory computer-readable medium according to claim 1, wherein the program code is further configured to cause the at least one computing device to at least:
   redirect the client device to the second management service for authentication with the second management service in response to the request for the client device to be managed by the second management service.

7. The non-transitory computer-readable medium according to claim 1, wherein the program code is further configured to cause the at least one computing device to at least:
   cause the client device to be managed by the first management service based at least in part on the device management data from the second management service;
   monitor the client device for non-compliance with at least one policy of the device management data from the second management service; and
   notify the second management service of the non-compliance.

8. The non-transitory computer-readable medium according to claim 1, wherein the program code is further configured to cause the at least one computing device to at least:
   identify a change in affiliation associated with at least one of the client device or the second management service; and
   notify the client device to check in for a device management update based on the change in affiliation.

9. A method for affiliated device management, comprising:
   identifying, by a first management computing device implementing a first management service, a request for a client device to be managed by a second management service;
   authenticating, by the first management computing device, the second management service for federated device management of the client device with the first management service;
   receiving, by the first management computing device, device management data from the second management service; and
   evaluating, by the first management computing device, the device management data from the second management service for conformity with a baseline management policy of the first management service.

10. The method according to claim 9, further comprising:
    in an instance in which the device management data from the second management service is in conformity with the baseline management policy, assimilating, by the first management computing device, at least a portion of the device management data from the second management service into federated management data for management of the client device by the first management service.

11. The method according to claim 10, wherein the federated management data comprises a combination of the device management data from the second management service and device management data from the first management service.

12. The method according to claim 11, further comprising:
after the assimilating, notifying, by the first management computing device, the client device to check in for a device management update, wherein:
the device management update includes the federated management data.

13. The method according to claim 9, further comprising:
in an instance in which the device management data from the second management service is not in conformity with the baseline management policy, notifying, by the first management computing device, the second management service that the device management data from the second management service is not in conformity.

14. The method according to claim 9, further comprising:
redirecting, by the first management computing device, the client device to the second management service for authentication in response to receiving the request from the client device to be managed by a second management service.

15. The method according to claim 9, further comprising:
causing, by the first management computing device, the client device to be managed by the first management service based at least in part on the device management data from the second management service;
monitoring, by the first management computing device, the client device for non-compliance with at least one policy of the device management data from the second management service; and
notifying, by the first management computing device, the second management service of the non-compliance.

16. The method according to claim 9, further comprising:
identifying, by the first management computing device, a change in affiliation associated with at least one of the client device or the second management service; and
notifying, by the first management computing device, the client device to check in for a device management update based on the change in affiliation.

17. A system for affiliated device management, comprising:
at least one memory device to store computer-readable instructions thereon; and
a first management computing device implementing a first management service and configured, through execution of the computer-readable instructions, to at least:
receive a request from a client device for affiliated device management with a second management service;
federate with the second management service based on an exchange of at least one identity certificate of a second management computing device implementing the second management service;
receive device management data from the second management service; and
evaluate the device management data from the second management service for conformity with a baseline management policy of the first management service.

18. The system according to claim 17, wherein the first management computing device is further configured to at least:
in an instance in which the device management data from the second management service is in conformity with the baseline management policy, assimilate at least a portion of the device management data from the second management service into federated management data for management of the client device by the first management service; and
notify the client device to check in for the federated management data.

19. The system according to claim 18, wherein the federated management data comprises a combination of the device management data from the second management service and device management data from the first management service.

20. The system according to claim 18, wherein the first management computing device is further configured to at least:
monitor the client device for non-compliance with at least one policy of the device management data from the second management service; and
notify the second management service of the non-compliance.

* * * * *